US012710064B2

(12) United States Patent
Jean

(10) Patent No.: US 12,710,064 B2
(45) Date of Patent: Aug. 18, 2026

(54) APPARATUSES, SYSTEMS, AND METHODS FOR EFFICIENT FLUID TRANSFER

(71) Applicant: AMPTECH INNOVATIONS LLC, Troy, NY (US)

(72) Inventor: Charles Jean, Troy, NY (US)

(73) Assignee: AMPTECH INNOVATIONS LLC, Troy, NY (US)

( * ) Notice: Subject to any disclaimer, the term of this patent is extended or adjusted under 35 U.S.C. 154(b) by 418 days.

(21) Appl. No.: 18/468,527

(22) Filed: Sep. 15, 2023

(65) Prior Publication Data

US 2024/0301900 A1 Sep. 12, 2024

Related U.S. Application Data

(60) Provisional application No. 63/489,734, filed on Mar. 10, 2023.

(51) Int. Cl.

| | |
|---|---|
| ***F15D 1/02*** | (2006.01) |
| ***F15D 1/04*** | (2006.01) |
| ***F16L 55/027*** | (2006.01) |

(52) U.S. Cl.

CPC ................. *F15D 1/02* (2013.01); *F15D 1/04* (2013.01); *F16L 55/02727* (2013.01); *F16L 55/02754* (2013.01); *F16L 55/02772* (2013.01)

(58) Field of Classification Search

CPC ................. F16L 55/04; F16L 55/02772; F16L 55/02727; F16L 55/02736; F16L 55/02754; F15D 1/04; F15D 1/02; B01F 25/432; B01F 35/561; F04B 39/0055

USPC ............................................ 418/15; 137/808

See application file for complete search history.

(56) References Cited

U.S. PATENT DOCUMENTS

| | | | | |
|---|---|---|---|---|
| 3,398,765 | A * | 8/1968 | Oshima | F15D 1/04 73/861.61 |
| 4,232,710 | A * | 11/1980 | Gallo | F15D 1/04 138/37 |
| 4,679,597 | A * | 7/1987 | Stein | F16L 55/02772 181/280 |
| 5,232,052 | A * | 8/1993 | Arvidson | G05D 11/131 169/44 |
| 5,363,699 | A * | 11/1994 | McCall | F15D 1/02 138/40 |
| 6,729,843 | B1 * | 5/2004 | Nichtawitz | F03B 13/08 415/208.1 |
| 8,215,345 | B2 * | 7/2012 | Clever | F15D 1/02 141/286 |
| 8,839,821 | B2 * | 9/2014 | Pinkerton | F15D 1/02 138/39 |
| 10,309,432 | B2 * | 6/2019 | Reckner | F16L 55/02754 |
| 11,002,301 | B1 * | 5/2021 | Schmidt | F16L 55/02772 |
| 11,319,974 | B2 * | 5/2022 | Schmidt | B01F 25/432 |
| 2004/0065375 | A1 * | 4/2004 | Snider | F15D 1/04 138/37 |
| 2020/0318770 | A1 * | 10/2020 | Soukup | F16L 55/02736 |

(Continued)

*Primary Examiner* — David Bochna

(74) *Attorney, Agent, or Firm* — Richard C. Pettus; Scott Goncher; Greenberg Traurig, LLP

(57) ABSTRACT

Efficient transfer of a fluid from one vessel to another, such as from a distribution center to a large tank on a truck, can occur via apparatuses, systems, and methods which may use an apparatus including a vane housing surrounding an inner pipe with an outer space formed therebetween, where the outer space includes a vane with a plurality of flutes.

16 Claims, 15 Drawing Sheets

(56) References Cited

U.S. PATENT DOCUMENTS

| | | | | |
|---|---|---|---|---|
| 2023/0132304 | A1* | 4/2023 | Yeung | F16L 55/02718<br>137/561 A |
| 2024/0252994 | A1* | 8/2024 | Yoo | B01F 35/561 |

* cited by examiner

TRANSPORT UNLOADER LINE

APPARATUSES, SYSTEMS, AND METHODS FOR EFFICIENT FLUID TRANSFER

CROSS REFERENCE TO RELATED APPLICATIONS

The present application claims priority to and the benefit of U.S. App. No. 63/489,734, filed Mar. 10, 2023, which is hereby incorporated by reference in its entirety.

FIELD OF DISCLOSURE

The present disclosure relates to pressurized fluid transfer systems, and specifically to an apparatus that reduces or eliminates cavitation when transferring a fluid (e.g., liquid, liquid natural gas, propane, oil, gasoline, water, liquified foods such as molasses and edible oils, beverages such as wine, beer, and milk, pharmaceutical and medicinal products, industrial chemicals) and to fluid transfer systems utilizing such apparatus. The apparatuses of the present disclosure may be positioned on an outlet of positive displacement (e.g., fluid displacement) and/or centrifugal pumps. These apparatuses may provide a manner of benefit to the fluid transfer systems of the present disclosure, such as a reduction in turbulent flow including a conversion of some or all of the turbulent flow to helical/laminar flow.

BACKGROUND

Transfer of pressurized fluids or liquid gasses, such as liquid natural gas and propane, is often required at several stages in their distribution. Typically, the steps of distribution may be between a production source distribution center to a large tank on a truck and/or from any of these source vessels to a transportation vessel (e.g., truck rail, ship) and/or from transportation vessel to an end user's storage vessel (e.g., tank or container such as a liquid propane tank). In these fluid transfer steps, a pump generally forms a part of a fluid transfer system that pumps the liquid from the first vessel to the second vessel). While necessary to achieve the goal, the design of conventional pumps used for this purpose creates cavitation in the fluid, often causing vapor locks. Cavitation occurs when a rapid change of pressure in a liquid, such as that caused by the pump, leads to the formation of small vapor-filled cavities.

Vapor lock is the aggregation of cavitation bubbles such that the vapor formed from the cavitation has nowhere to go and blocks or slows down the fluid's flow. In some embodiments, vapor lock may be the thermal expansion of liquid propane to propane gas which typically induces the formation of cavitation bubbles. In a typical transfer from a distribution center to a large tank on a truck, a 32 A motor may power the pump and a successful transfer may take up to 60 minutes (e.g., 15-60 minutes). However, could vapor lock be avoided, the same pump would be able to transfer propane to a truck more efficiently and in less time.

SUMMARY

In accordance with the foregoing objectives and others, the present disclosure provides an apparatus, system, and methods which may decrease vapor lock during fluid transfer which typically results in improved fluid characteristics and results such as more efficient fluid transfer between vessels. These apparatuses, systems and methods may allow for efficient transfer of a fluid from a large vessel to a smaller vessel (e.g., as compared to an analogous pumping system without an apparatus of the present disclosure). Without wishing to be bound by theory, the apparatuses, systems, and methods of the present disclosure are able to decrease (or eliminate entirely) cavitation during fluid transfer. Incorporation of various elements such as the vanes as described herein which augment fluid flow may decrease transfer time by, for example, more than 20% or more than 30% or more than 40% or more than 50 or more than 60% or more than 70% or more than 80% or more than 90% of the transfer time required in an otherwise identical system not having an apparatus as described herein.

Typically, the apparatus may be dimensioned to be placed between a pump that causes cavitation and the hose (e.g., a hose that may be used to fill a smaller vessel). The apparatus may include a vane housing such as a pipe having an inner pipe disposed within the vane housing. The inner pipe may be concentric with the vane housing. The configuration of the apparatus forms an outer space between the vane housing and the inner pipe. Furthermore, an inner space is formed within the inner pipe. Typically, one or more vanes are disposed within the outer space (e.g., by being disposed on the vane housing, by being disposed on the inner pipe). In some embodiments, said vane housing and said inner pipe wall are concentric. In some embodiments, a major longitudinal axis of said vane housing and a major longitudinal axis of said inner pipe are substantially parallel (e.g., the angle between said major longitudinal axes is within 5°). The vanes may include a number of flutes segmented (e.g., equally segmented) in the outer space such as flutes segmented around the inner pipe and/or around the vane housing. The flutes may be attached to and extend from the inner pipe toward the vane housing. In such embodiments, and typically when in use in concentric embodiments, the entire inner pipe with its attached flutes may spiral around the axis that is the common center of the vane housing, the outer space, the inner pipe, and the inner space. When the flutes spiral around the major longitudinal axis, as the position of the flute in each successive cross sectional plane perpendicular to the major longitudinal axis in the direction of fluid flow may appear to rotate around the axis. It will be understood that "rotation" of the vanes refers to rotation in these successive planes (typically in spiral and nonlinear flute configurations). The rotation of the inner pipe may be with respect to the vane housing. In certain embodiments, the vane may include an outer pipe wall set within the vane housing, and the flutes extend within the outer space, from this outer pipe wall toward the inner pipe. In some embodiments, the absolute value of the angle of the spiral in the flutes, with respect to the major longitudinal axis will be less than 50° or less than 40° or less than 30° (e.g., from 0.5° to 50°, from 0.5° to 40°, from 0.5° to 30°, from 5° to 50°, from 5° to 40°, from 5° to 30°, from 10° to 10°, from 10° to 40°, from 10° to 30°, from 15° to 15°, from 15° to 40°, from 15° to 30°, from 15° to 25°). In some embodiments, a flute may have one or multiple angles with respect to the longitudinal axis (e.g., in a curved configuration), such as having an angle of from −50° to 50° (e.g., from 0.5° to 50°, from 0.5° to 40°, from 0.5° to 30°, from 5° to 50°, from 5° to 40°, from 5° to 30°, from 10° to 10°, from 10° to 40°, from 10° to 30°, from 15° to 15°, from 15° to 40°, from 15° to 30°, from 15° to 25°, from −0.5° to −50°, from −0.5° to −40°, from −0.5° to −30°, from −5° to −50°, from −5° to −40°, from −5° to −30°, from −10° to −10°, from −10° to −40°, from −10° to −30°, from −15° to −15°, from −15° to −40°, from −15° to −30°, from −15° to −25°) or from −40° to 40° or from −30° to 30°, or combinations thereof.

Within a pumping system, the vane may be disposed on the outlet side of the pump, rather than the inlet side of a combustion chamber. The vane may have a vane front on the side of the apparatus closer to the pump and a vane back on the side of the apparatus closer to the hose. The apparatus may include a pump side connected to the vane front and a hose side connected to the vane back. The pump side and the hose side may be concentric reducers such as cone shaped sections use to connect tube or pipe sections along the same axis as the tube or pipe. The concentric reducers may be welded to the vane housing. In various implementations, the concentric reducers may have a curved reducer surface (e.g., along the major longitudinal axis) and/or straight surface (e.g., along the major longitudinal axis).

By leveraging various vane configurations, the fluid and cavitation flow may be augmented in order to reduce vapor lock and increase total pump efficiency.

For example, the vane may include one or more flutes (e.g., one, two, three, four, five, six, seven, eight or more flutes). The number of flutes may be related to the size of the flute. For example, some pipes may have a diameter that requires more than eight flutes (e.g., 8-20 flutes). In some embodiments, the vane includes six straight flutes that run along the outer length of the inner pipe. In this version, the vane may include a vane cap at the vane front. The flutes may connect to one another at the vane cap and cross over the vane entrance to the inner pipe. Without wishing to be bound by theory, cavitation bubbles may flow through the inner pipe, drawn by the mass flow of the fluid, but once at the vane back, are drawn into the outer space of the vane. The cavitation bubbles may be re-liquefied (e.g., the cavitation bubbles are broken up and/or resorbed into the liquid). In some embodiments, the vapor may be converted back to liquid through a phase change and reintroduced into the liquid stream. In some embodiments, the cavitation bubbles may move in a direction opposite of that from the mass flow, before rejoining the mass flow as liquid again at the vane front. A pitch at an elbow may draw the cavitation bubbles back toward the pump.

In one embodiment, the vane includes three flutes, each with a flute curvature. The cavitation bubbles may be caught by the flute curvature at the vane front and re-liquefied as they travel through the outer space toward the vane back or the vane front. Without wishing to be bound by theory, the cavitation bubbles may be drawn into the outer space and the vane at the vane front or vane back and typically travel in the opposite direction of mass flow. The pitch of the vane in the system may be used to alter the direction of travel.

In some embodiments, the inner pipe may not be a completely empty tube, but may include structural supports within, such as cross beams running the length of the inside of the inner pipe.

In particular embodiments, the ratio of the diameter of the outer pipe to the inner pipe may be from 1.1:1 to 3:1 (e.g., from 1.2:1 to 2:1, 1.5). For example, the inner pipe may have a diameter of 3", the outer space extends another 0.75" of diameter around the inner pipe, and the total inner diameter of the vane housing is 4.5". The ratio of each flute height to the inner space diameter may independently range, for example, from 1:1 to 1:5 or from 1:1.1 to 1:4 or from 1:1.5 to 1:3.5 or from 1:2 to 1:3.5. The length of each flute may independently be from 2" to 10" and/or have a width of less than ⅓". For example, a flute may have the dimensions of 6" by 0.50" by 3⁄32". With these dimensions, a valve (e.g., 3000 lb. half coupling valve, e.g., conical valve) may extend approximately 0.75" toward the vane when the valve is in the open position. It will be understood that these ratios are exemplary and not limiting.

In some embodiments, the apparatus may further include a valve disposed on the hose side and be capable of stopping or slowing the flow out of the apparatus and into the hose to the second vessel such as an internal excess flow cut off valve. The valve may be remotely controlled and pneumatically operable to open and close. When the valve is in a closed position, no fluid may flow from the apparatus into the hose. When the valve is in an open position, fluid may flow. The valve is preferably a triangular valve (e.g., with a 3000 lb. half coupling). Such a valve may allow for a flow rate of from 200 to 300 gallons per minute (GPM) (e.g., 250 GPM). Typically, limits of the output pump are limited by the input energy and size and dimensions of the pump and system. The valve may also have a full coupling and allowing for slower flow"11 rates less than 200 GPM such as from 100 GPM to 200 GPM (e.g., 130 GPM). A valve (e.g., triangular valve, conical valve) may be used, such that when in an open position, the valve may extend toward the vane back of the vane, providing a space around the valve through which the fluid may flow when the valve is open.

In some embodiments, the apparatus also includes a pipe section with an elbow, where the pipe section is connected to the pump side. The elbow is an angle in the pipe section, such as a 90° angle. In such embodiments, a directional plate may be disposed within the pipe section at the elbow. The directional plate is typically designed to reduce the flow hydraulics at the elbow from turbulence cause by the cavitation and high flow volume from the pump. The directional plate may be considered another vane inasmuch as it alters fluid flow such that the apparatus comprises at least two vanes: a first vane having an outer space comprising flutes and a second vane that is a directional plate. The angle of the elbow creates a long side of the elbow, or the outer elbow, and a short side of the elbow, or the inner elbow. The directional vane may be disposed along the outer elbow portion of the inside of the elbow.

Although experimentation has shown that this is the optimal disposition of the directional vane in order to reduce or eliminate the turbulent flow, the directional vane may be disposed anywhere within the pipe section that would achieve the desired reduction or elimination of turbulence. The directional plate may have a pump end and a hose end, each of which may be welded to the inside of the elbow wall. For example, the directional plate may extend from the outer elbow such that fluid entering the elbow is directed by the directional plate to reduce turbulent flow at exit. For example, the directional plate pump end may be angled at from 20°-30° (e.g., 22.5°) from the elbow wall (particularly when the elbow has an angle of from 80°-100° or 85°-95° or 90°. The directional plate may prevent some turbulent flow from the mass flow through the inner pipe. The directional plate may be, for example, square or rectangular having dimensions of at least 1" (e.g., from 1"-5", from 2"-4", 3"). In some embodiments, the geometry of the directional plate is square (in addition to the points of attachment to the elbow) such that each side has a length of from 1"-5" (e.g., 3"×3"). Without wishing to be bound by theory, this feature, combined with the cavitation reduction or elimination afforded by the vane, may allow for a smooth, non-turbulent flow through the valve (if included) and the hose. Either may be used alone, but each component when used in concert provide increased efficiencies in pumping speed. In some embodiments that include the pipe section, the apparatus and/or system may include the pump.

In some embodiments, the apparatus, system or method may also include a hose connector attached to the hose side end of the nozzle. The hose connector connects the apparatus to the hose to the second vessel. The hose connector may include a ball valve for shutting off, tempering flow, or allowing and/or controlling flow into and through the hose.

The system and/or method may be adapted for use in the transfer of a fluid (e.g., liquid, liquid natural gas, propane, oil, gasoline, water, fluid product such as a cosmetic product or pharmaceutical product, or intermediate therefor) from a distribution center to a large truck. The system may include the apparatus, including the vane; a pump having a pump inlet and a pump outlet; a pump outlet pipe extending between the pump outlet and the pump side of the apparatus; and a hose connector connected to the hose side of the apparatus. The fluid typically flows from distribution tanks to the pump inlet. The pump moves the fluid though the pump outlet, the pump outlet pipe, the pump side of the apparatus, the vane of the apparatus, the hose connector, and finally to a truck for distribution. In the preferred embodiment, the system may accommodate filling more than one truck at a time. In preferred embodiments, a pipe section with an elbow is included between the pump outlet pipe and the pump side of the apparatus.

The system may be housed on a frame, which may allow manufacture off-site and installation as a unit. The frame may have a base width and a base length less than 5'. The system may also be retrofitted or accommodated by any existing distribution center or plant.

In preferred embodiments, the hose connector of the system also includes a ball valve that regulates the flow of the fluid from the distribution tank into the system.

Various components of the system and/or method may be chosen to further decrease fluid turbulence during transfer. For example, the pump motor may include a soft start feature allowing for a progressive ramp and/or variable speed of the motor and the pump that the motor powers. A ramping may decrease turbulence induce by the pump. Furthermore, the soft start feature may cause less heat upon starting the motor, which reduces the amount of cavitation bubbles. The soft start feature may be integral with the motor or a separate device. It may be any soft starter that temporarily reduces the electric surge of the motor during startup.

In various embodiments, the system also includes a transport unload pipe, transport unload valve, and transport unload connector. As the truck tank is filled with fluid, such as propane, the fluid may displace vapor in the tank. In these embodiments, the transport unload pipe may be connected to the tank with the transport unload connector, and the displaced vapor may be removed from the tank through the transport unload pipe. The transport unload valve typically controls the rate of the vapor leaving the tank through the transport connector and pipe.

In certain embodiments, the pump outlet pipe includes a section of increased diameter which may lower pressure of the fluid during its flow.

In some embodiments, the system and/or method includes two vanes and two hose connectors, and a single pump. The two hose connectors may be provided to accommodate the connection to and filling of two tanks. The vanes may increase the efficiency of the pump to such a degree that a single pump can fill (e.g., simultaneously fill) more than one tank (e.g., two tanks, three tanks).

In specific embodiments, the pump may be powered by a 32 A motor. As a direct comparison, a system without the vanes of the present disclosure using a single pump might be able to fill a 3200 gal tank in up to 1 hour (e.g., 15-20 minutes). The present system using the same single pump could fill the same tank in 9-12 minutes. In this comparison, the system without the vanes uses the motor at its full capacity. However, using the present system, on the other hand, requires only 13-18 A to power the pump. In some embodiments, the systems of the present disclosure may be characterized by a pumping power of less than (or from 10% to) 80% or less than 70% or less than 60% or less than 50% of the pumping time of an otherwise identical system that does not include the vane. In some embodiments, the systems of the present disclosure may be characterized by a pumping time of less than (or from 10% to) 80% or less than 70% or less than 60% or less than 50% of the pumping time of an otherwise identical system that does not include the vane. Indeed, a recent test showed the system using only 9 A of a 15 A motor and pumping 258 gal/min, which was 100 gal/min higher than the pump's rating. Thus, the present systems, apparatuses, and methods are demonstrably more efficient than otherwise identical fluid transfer systems in time, power, and/or cost. The present systems, apparatuses, and methods may be more efficient relative to an otherwise identical system relative to the size of the pump and/or the input energy being applied. The apparatuses, systems, and methods of the present disclosure can be scaled in size depending on the application (e.g., from large scale oil tanker transport to small scale medical applications).

It is an aspect of the disclosure to provide apparatuses, methods, and systems providing efficient transfer of a fluid. The methods typically comprise pumping a fluid through an apparatus of the present disclosure. These may include a vane housing and an inner pipe disposed within the vane housing such that the vane housing and the inner pipe are optionally concentric; an inner space formed within the inner pipe wall; an outer space formed between the vane housing and the inner pipe; a vane having a plurality of flutes and extending between a vane front and a vane back; a pump side disposed adjacent to the vane front and attached to the vane housing; and a hose side disposed adjacent to the vane back and also attached to the vane housing. It is a further aspect of the disclosure to provide an apparatus for efficient transfer of a fluid that also includes a pipe section connected to the pump side; an elbow within the pipe section such that said pipe section is angled at the elbow; and a directional plate disposed within the pipe section at the elbow. It is a further aspect of the disclosure to provide an apparatus for efficient transfer of a fluid in which the angling of the elbow renders the outer elbow longer than the inner elbow, and the directional plate is disposed within the pipe section at the outer elbow. It is a further aspect of the disclosure to provide an apparatus for efficient transfer of a fluid in which the directional plate has a directional plate pump end attached to the elbow wall; a directional plate hose end also attached to the elbow wall; and a directional plate angle disposed between the directional plate pump and hose ends, such that the directional plate angle is unattached to the elbow wall. It is a further aspect of the disclosure to provide an apparatus for efficient transfer of a fluid in which the pump side and the hose side are concentric reducers. It is a further aspect of the disclosure to provide an apparatus for efficient transfer of a fluid in which each of the concentric reducers have a reducer curvature. It is a further aspect of the disclosure to provide an apparatus for efficient transfer of a fluid in which a valve is disposed within the hose side and is movable from a closed position such that the fluid cannot pass the valve and an open position such that the fluid can pass the valve. It is a further aspect of the disclosure to provide an apparatus for efficient transfer of a fluid in which the valve is a triangular valve that extends toward the hose side when the valve is in the open position. It is a further aspect of the disclosure to provide an apparatus for efficient transfer of a fluid in which each flute has a flute curvature. It is a further aspect of the disclosure to provide an apparatus for efficient transfer of a fluid in which each flute is straight. It is a further aspect of the disclosure to provide an apparatus for efficient transfer of a fluid in which the flutes are attached to and extend outward from the inner pipe. It is a further aspect of the disclosure to provide an apparatus for efficient transfer of a fluid in which a vane cap is included and in which at least two of the plurality of flutes cross across the inner pipe at the vane front. It is a further aspect of the disclosure to provide an apparatus for efficient transfer of a fluid in which the inner pipe includes structural support. It is a further aspect to provide a system for efficient transfer of fluid, including an apparatus, a pump with a pump inlet and a pump outlet, a motor that powers the pump, a pump outlet pipe extending between the pump outlet and pump side of the apparatus, and a hose connector connected to the hose side of the apparatus. It is a further aspect of the disclosure to provide a system for efficient transfer of a fluid in which a pump is disposed downstream from the pump side end of the apparatus. It is a further aspect of the disclosure to provide a system for efficient transfer of a fluid that includes a pipe section with an elbow, where the pipe section extends between the pump outlet pipe and pump side of the apparatus. It is a further aspect of the disclosure to provide a system for efficient transfer of fluid that includes a frame on which the other system components are supported. It is a further aspect of the disclosure to provide a system for efficient transfer of fluid that the frame have a base no larger than 5'×5'. It is a further aspect of the disclosure to provide a system for efficient transfer of a fluid in which a hose connector is disposed at the hose side of the apparatus. It is a still further aspect of the disclosure to provide a system for efficient transfer of a fluid in which the hose connector includes a ball valve. It is a further aspect of the disclosure to provide a system for efficient transfer of fluid whose motor includes a soft start feature. It is a further aspect of the disclosure to provide a system for efficient transfer of fluid that also includes a transport unload pipe, valve, and connector. It is a further aspect of the disclosure to provide a system for efficient transfer of fluid whose pump outlet pipe includes a section of increased diameter. It is a further aspect of the disclosure to provide a system for efficient transfer of fluid that includes two hose connectors so as to fill two tanks with the single pump of the system.

These systems, apparatuses, and methods may be used to transfer any number of fluids between vessels such as liquids, liquid natural gas, propane, oil, gasoline, water, liquified foods such as molasses and edible oils, beverages such as wine, beer, and milk, pharmaceutical and medicinal products, or industrial chemicals.

These aspects are not meant to be exclusive and other features, aspects, and advantages will be readily apparent to those of ordinary skill in the art when read in conjunction with the following description and accompanying drawings.

DETAILED DESCRIPTION

Figure 1:
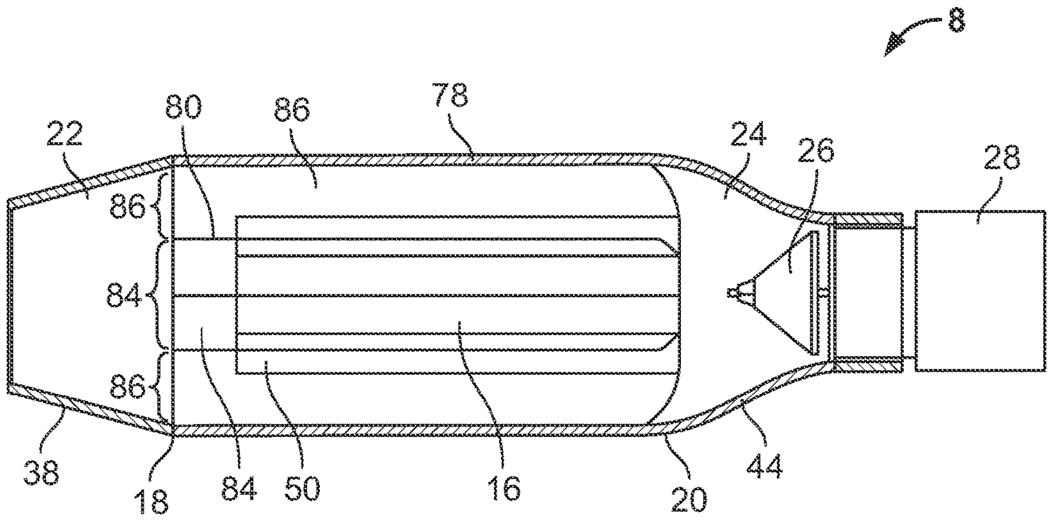
FIG. 1 is a side cutaway view of an apparatus of the present disclosure including a nozzle.

Detailed embodiments of the present disclosure are disclosed herein; however, it is to be understood that the disclosed embodiments are merely illustrative of the disclosure that may be embodied in various forms. In addition, each of the examples given in connection with the various embodiments of the disclosure is intended to be illustrative, and not restrictive.

All terms used herein are intended to have their ordinary meaning in the art unless otherwise provided.

As used herein, "a" or "an" shall mean one or more. As used herein when used in conjunction with the word "comprising," the words "a" or "an" mean one or more than one. As used herein "another" means at least a second or more.

As used herein, all ranges of numeric values include the endpoints and all possible values disclosed between the disclosed values. The exact values of all half integral numeric values are also contemplated as specifically disclosed and as limits for all subsets of the disclosed range. For example, a range of from 0.1% to 3% specifically discloses a percentage of 0.1%, 1%, 1.5%, 2.0%, 2.5%, and 3%. Additionally, a range of 0.1 to 3% includes subsets of the original range including from 0.5% to 2.5%, from 1% to 3%, from 0.1% to 2.5%, etc. Unless the context permits otherwise, the sum of all percentages will not exceed 100%. It will be understood that reference multiple Referring first to FIGS. 1 and 3A-B, a side cutaway view of apparatus 8 is provided. Vane housing 78 surrounds vane 16. Flutes 50 of vane 16 are attached to and extend from inner pipe 80. Outer space 86 is formed between vane housing 78 and inner pipe 80. As can be seen, outer space 86 surrounds inner pipe 80. Inner space 84 is formed within inner pipe 80. Flutes 50 are disposed are disposed only within outer space 86 and no protrusions are present in inner space 84. In some embodiments, inner space 84 may include one or more flutes. Vane front 18 and vane back 20 delineate the length of vane 16 (e.g., the length may be measured based on the length along the fluid flow direction such as a major longitudinal axis where both the inner and out pipe are present). Pump side 22 is disposed adjacent to vane front 18. Hose side 24 is disposed adjacent to vane back 20. Each of pump side 22 and hose side 24 are concentric reducers such as concentric reducer 38. Hose side 24 has the reducer curvature 44 in the walls of hose side 24, while pump side 22 has straight or angled walls with no curvature. Valve 26 is disposed within hose side 24 and is shown in an almost closed position. If valve 26 were in a full closed position, there would be no space behind valve 26 through which fluid could pass through to the fluid feedthrough of hose connector 28. Valve 26 is also illustrated in open position 46 in FIGS. 1 and 3A. On the right of nozzle 10 is hose connector 28 that will connect apparatus 8 to a hose and is shown in more detail in FIG. 3A.

Figure 2:
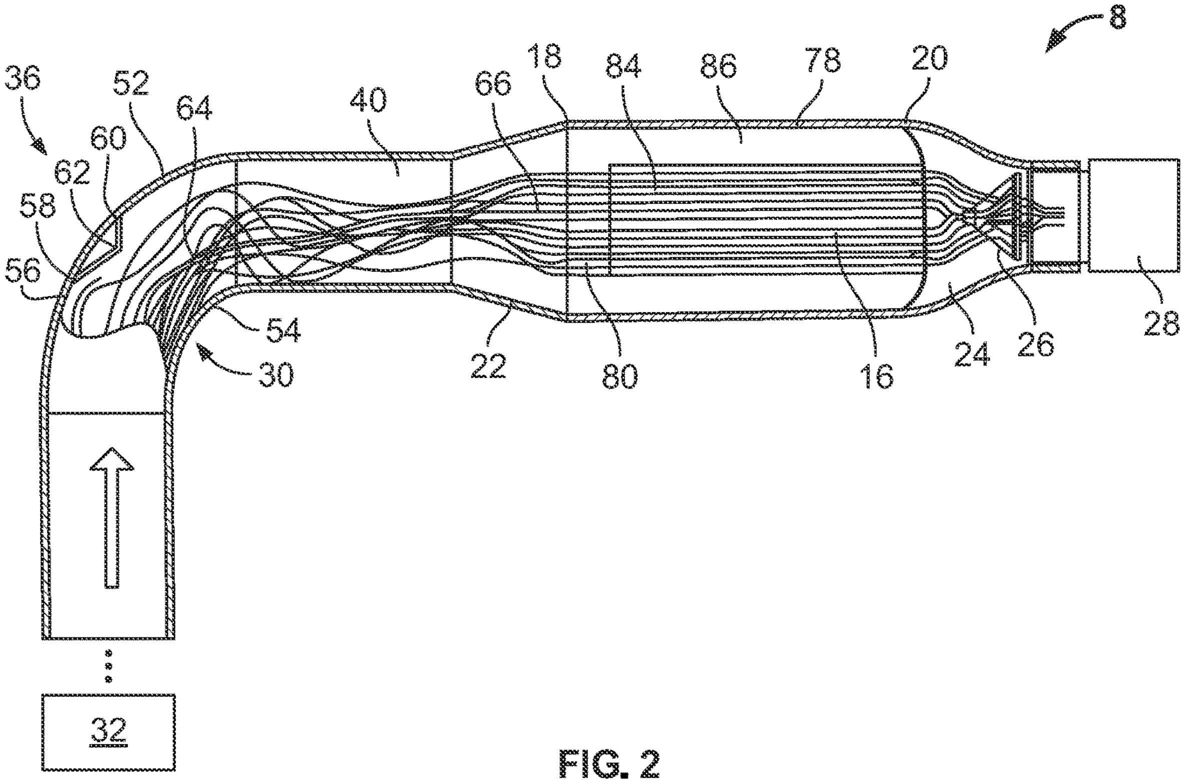
FIG. 2 is a side cutaway diagram of the apparatus of the present disclosure.

Now referring to FIG. 2, a side cutaway diagram of apparatus 8 is provided. This embodiment of apparatus 8 also includes pipe section 40, including elbow 30. Elbow 30 is shown at an angle of 90°. The angle provides elbow 30 with a longer section outer elbow 52 and a shorter section inner elbow 54. Within elbow 30 is directional plate 36. Directional plate 36 is a plate with a directional plate pump end 58, a directional plate hose end 60, and a directional plate angle 62 therebetween. Directional plate pump end 58 extends into elbow 30 from outer elbow 52 such that flow through pipe section 40 is redirected into the straight section of pipe section 40. In the embodiment depicted, directional plate pump end 58 is angled at 22.5° from the elbow wall 56 as measured by angle of directional plate pump end 58 and the tangential of outer elbow 52 where directional plate pump end is attached (e.g., by welding). Each of the directional plate pump and hose ends 58 and 60, respectively, are attached, preferably by welding, to the elbow wall 56. Directional plate angle 62 is not attached to the elbow wall 56 and is the furthest point of the directional plate 36 from the elbow wall 56. The arrow shown below elbow 30 indicates the direction of the fluid flow from pump 32, which is disposed somewhere downstream. The various lines and squiggles within pipe section 40 illustrate the turbulent flow 64 caused by pump 32 and the mitigation and/or elimination of turbulence caused by directional plate 36 into laminar flow 66 upon entrance to inner pipe 80.

Figure 3A:
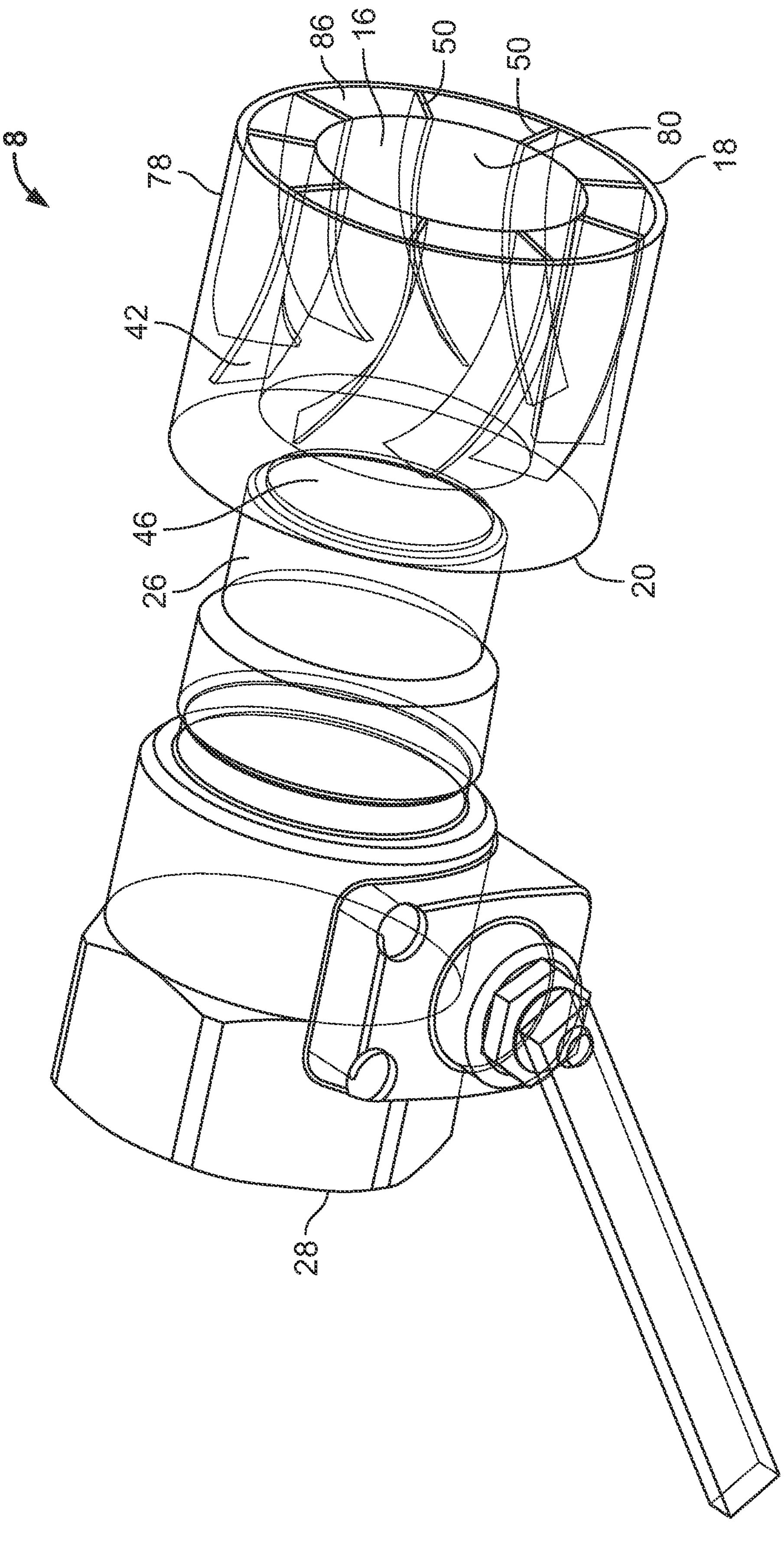
FIG. 3A is a three-dimensional view of the nozzle and hose connector of the present disclosure, with internal components visible.
Figure 3B:
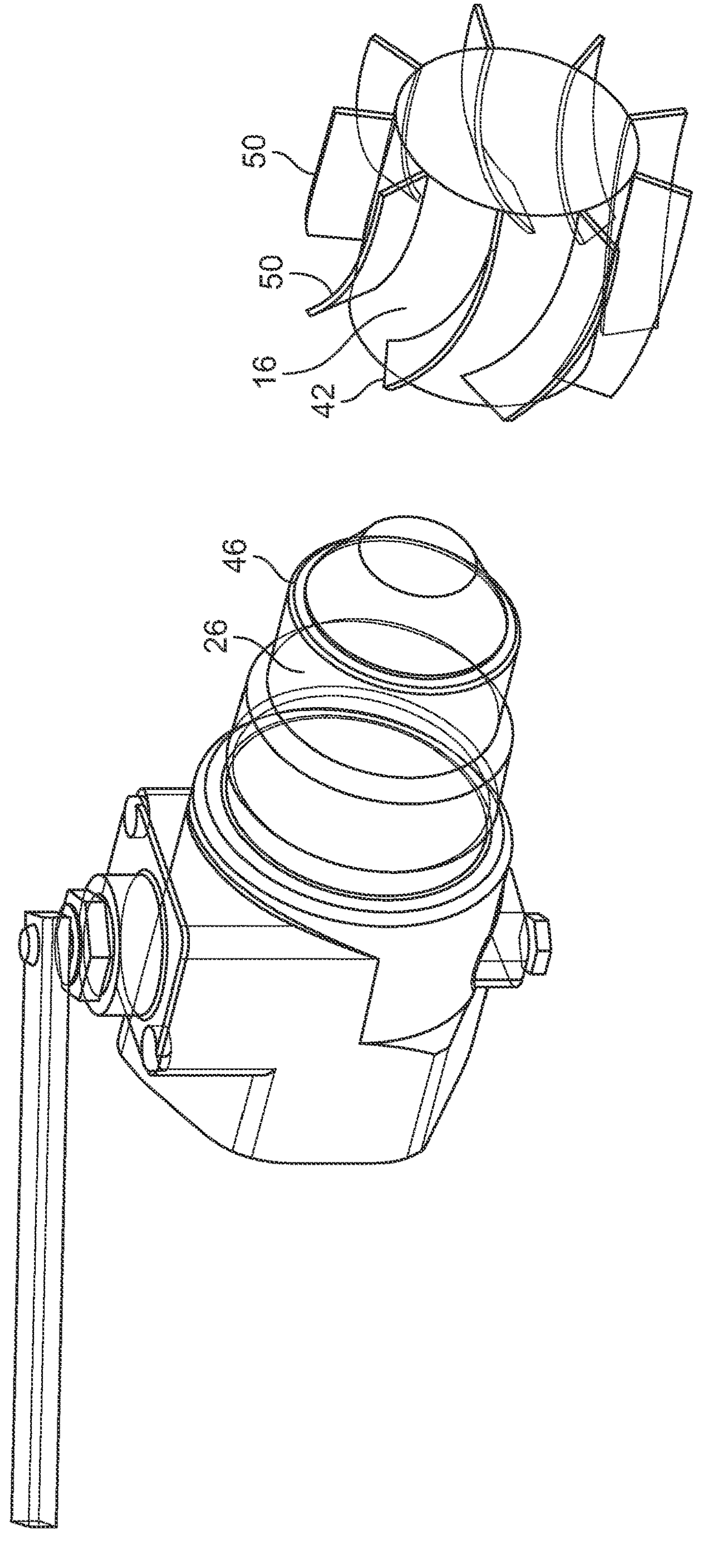
FIG. 3B provides a three dimensional view of a nozzle and vane illustrate a curved flute configuration.

Now referring to FIG. 3A, a three-dimensional view of the apparatus 8. Internal components, such as flutes 50 of vane 16 and valve 26 are shown within the bolder lines of the outer components. Vane 16 has eight flutes 50 equally segmented within outer space 86 and around inner pipe 80. Flutes 50 have a flute curvature 42 that may aid in drawing the cavitation bubbles into the outer space 86 and in re-liquefying the cavitation bubbles. As can be seen in FIG. 1, vane 16 and flutes 50 extend between vane front 18 and vane back 20. Valve 26 is shown in open position 46 extending toward vane 16, allowing fluid flow past valve 26 and into the direction of the connector 28 and the hose beyond (not shown). As shown in FIGS. 1 and 3A-3B, hose connector 26 is shown with hose ball valve for shutting off or allowing flow.

Figure 4A:
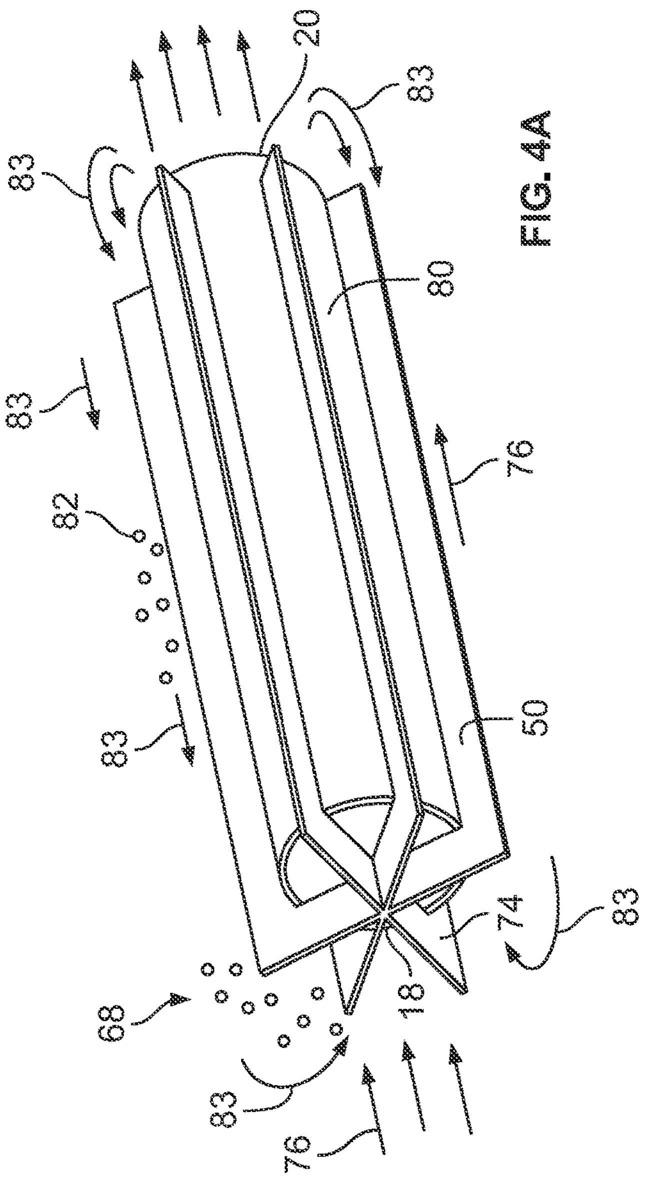
FIG. 4A is a perspective view of a vane of the present disclosure (the vane housing is omitted from the figure).

Now referring to FIG. 4A, a perspective view of the interior of straight flute vane 68 is provided. In this view, the vane housing is not shown, so that the inner components may be illustrated more clearly. Straight flute vane 68 has straight flutes 50, such as six of them disposed around the outer diameter of the inner pipe 80, as shown. Flutes 50 are attached to and extend from inner pipe 80 into the outer space. Straight flute vane 68 includes vane cap 74, which comprises a crossing of flutes 50 over the entrance of inner pipe 80, disposed at vane front 18. In this embodiment, mass flow 76 enters the inner space of inner pipe 80 at vane front 18. At vane back 20, cavitation bubbles 82 are drawn into outer space and may proceed against the direction of mass flow 76 back toward vane front 18. A pitch, or upward angle, which may be at elbow 30 will draw the cavitation bubbles 82 back toward pump (e.g., pump 32 in FIGS. 2, 6A and 6B). As can be seen in FIG. 2, the cavitation bubbles may be moved via vane 16 in a helical rotation which may induce re-liquification into the mass flow. As can be seen, the mass flow 76 through the inner space 86 while cavitation bubble flow 83 moves through the outer space in the opposite direction following exit from the inner space 83.

Figure 4B:
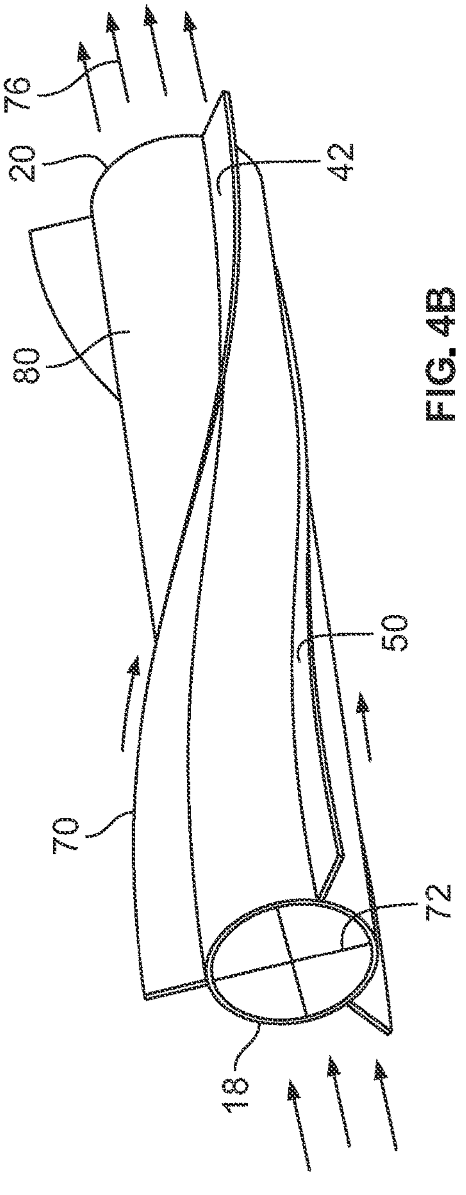
FIG. 4B is a perspective view of a vane of the present disclosure.

Now referring to FIG. 4B, a perspective view of preferred curved flute vane 70 is provided. Again, the vane housing is eliminated from this view. Curved flute vane 70 has flutes 50 with flute curvature 42, such as three of them, as shown, which extend from inner pipe 80 along the major longitudinal axis in a rotated, spiral, and/or curved configuration. Flutes 50 are attached to and extend from inner pipe 80 into the outer space. The inner space is not necessarily an empty space, but instead, may include a structural support, such as structural cross 72, as shown, which extends down the length of inner pipe 80. In this embodiment, the rotating curved flutes 50 catch the cavitation bubbles at vane front 18 and re-liquefy them as they move through outer space 86. Mass flow 76 moves through the inner space of inner pipe 80 and the re-liquefied cavitation bubbles rejoin mass flow 76 at vane back 20. The embodiment shown in FIG. 4B is similar to that shown in FIGS. 3A and 3B, as the vane shown in each is a curved flute vane. They differ in that the curved flute vane in FIG. 4B has only three flutes 50, while that shown in FIG. 3 has eight. In some embodiments, the apparatus may comprise one, two, three, four, five, six, seven, eight, nine, or ten flutes. Also, the curved flute vane 70 shown in FIG. 4B includes structural cross 72 within inner space 84, while that shown in FIG. 3 does not include such a structure. These various modifications provide substantially difference to fluid flow. For example, the embodiment illustrated in FIG. 4A as shown to allow for significantly faster fluid transfer.

Figure 4C:
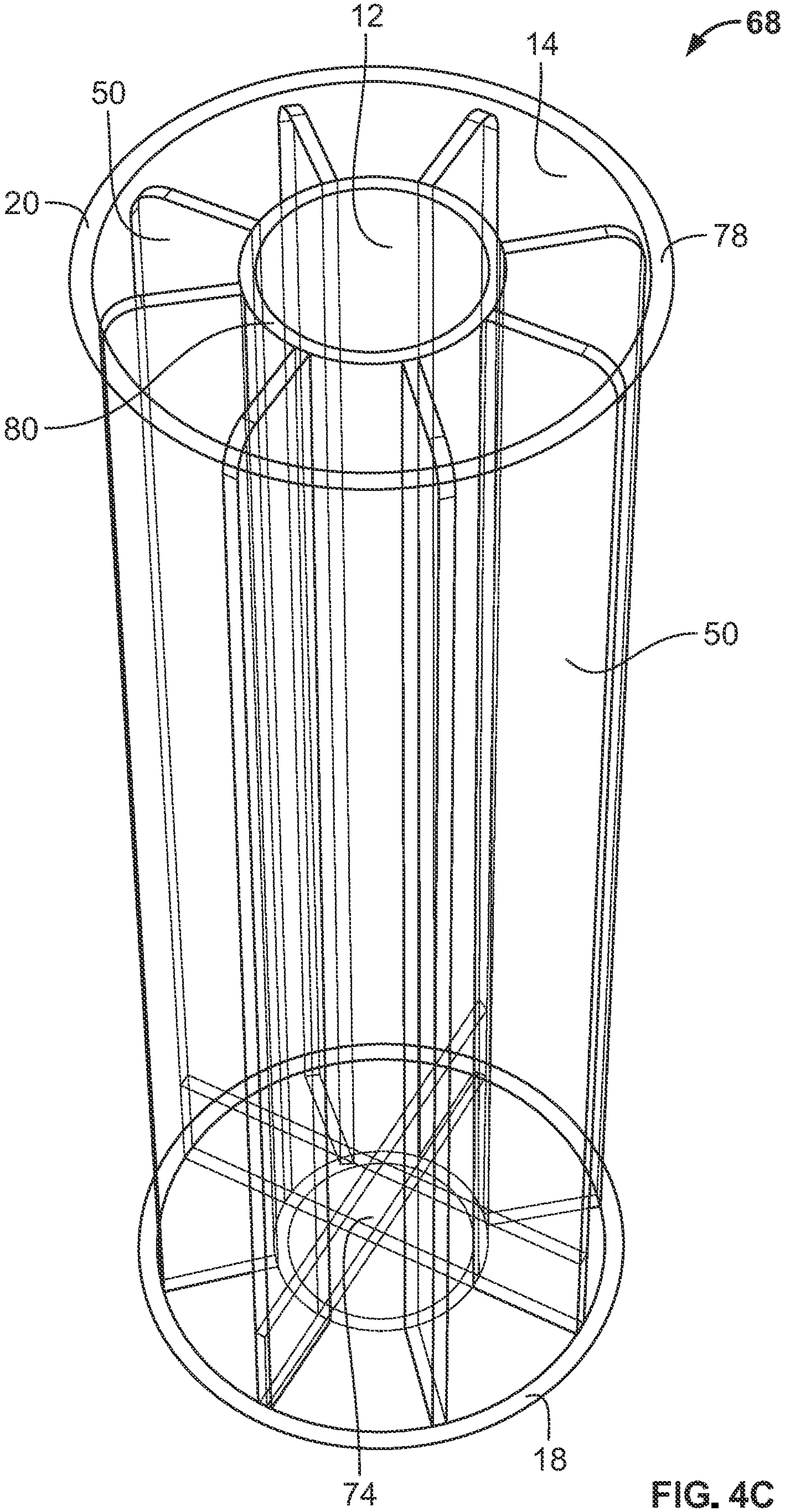
FIG. 4C is a three-dimensional view of a vane similar to that shown in FIG. 4A, with internal components visible.

Now referring to FIG. 4C, a three-dimensional "17" view of a straight flute vane 68 similar to that shown in FIG. 4A, with internal components visible is provided. This straight flute vane 68 has eight straight flutes 50 equally segmented around, attached to, and extending from inner pipe 80 into outer space 86. Like the straight flute vane 68 shown in FIG. 4A, this embodiment also includes a vane cap 74. The respective vane caps 74 are slightly different, however. In FIG. 4A, the vane cap 74 is comprised of each of the flutes 50 crossing across the entrance to inner pipe 80 so that vane front 18 is slightly separated from that entrance to inner pipe 80. In FIG. 4C, only two pairs of flutes 50 cross across the entrance to inner pipe 80, and they do so slightly within inner pipe 80 so that the entrance to inner pipe 80 and the vane front 18 are coplanar. In some embodiments all of the vane flutes cross to form the vane cap. In some embodiments, some (e.g., one less than the number of vane caps, an even number, one, two, three, four) of the vane flutes cross to form the vane cap.

Figure 5:
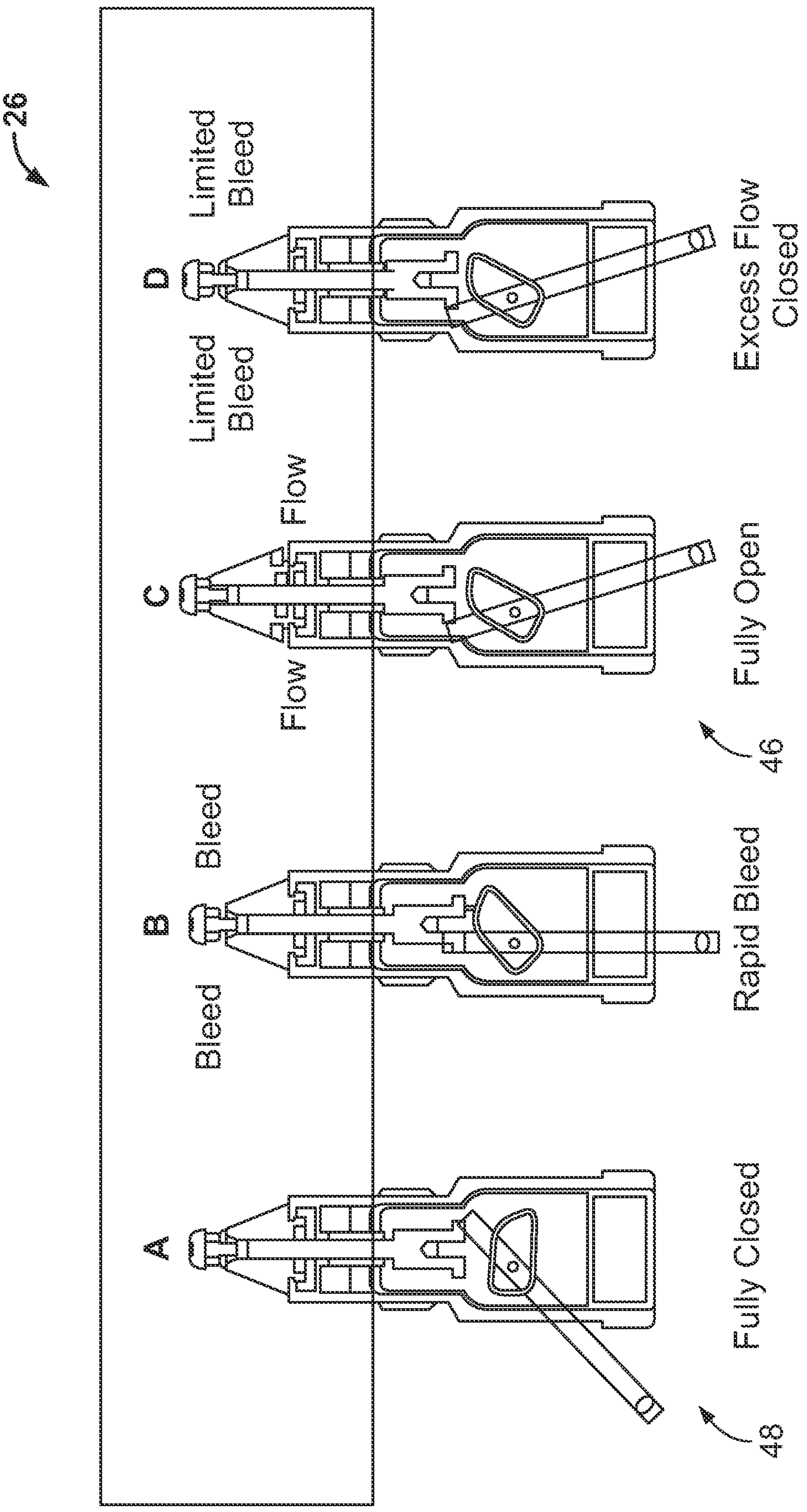
FIG. 5 is a diagram illustrating an exemplary valve to be used in the apparatuses, systems, and methods of the present disclosure.

Now referring to FIG. 5, a diagram of a valve 26, which may be used with the apparatuses of the present disclosure is provided. Valve 26 may be adjusted between at least an open position 46 or a closed position 48. Although one of ordinary skill in the art will recognize that many valves may be used for this purpose, the valve 26 and that shown in FIG. 5 is that sold under the trademark RegOtb, especially the A3209D or A3209DT series.

Figure 6A:
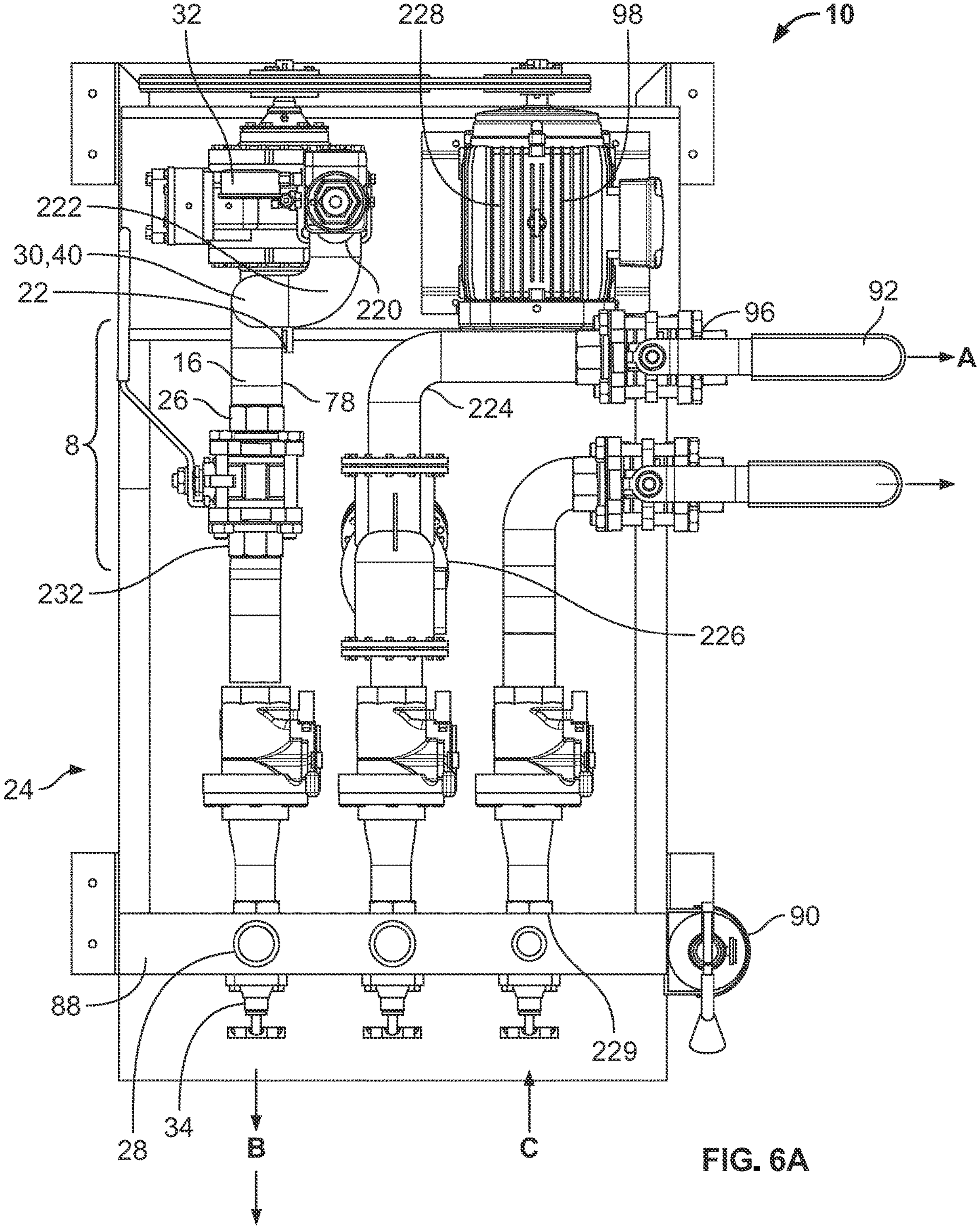
FIG. 6A is a plan view of one embodiment of the system of the present disclosure.
Figure 6B:
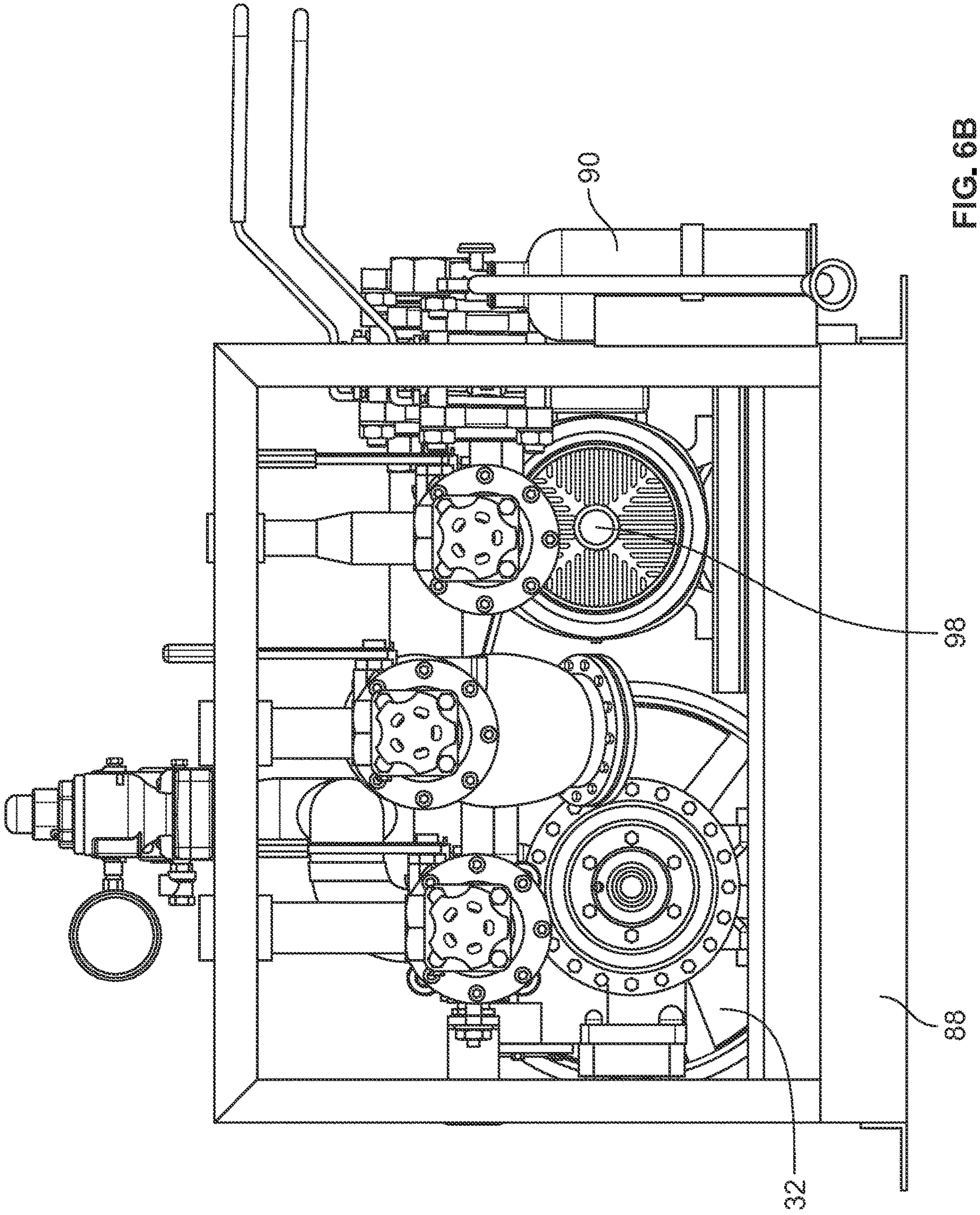
FIG. 6B is a front view of one embodiment of the system of the present disclosure.
Figure 6C:
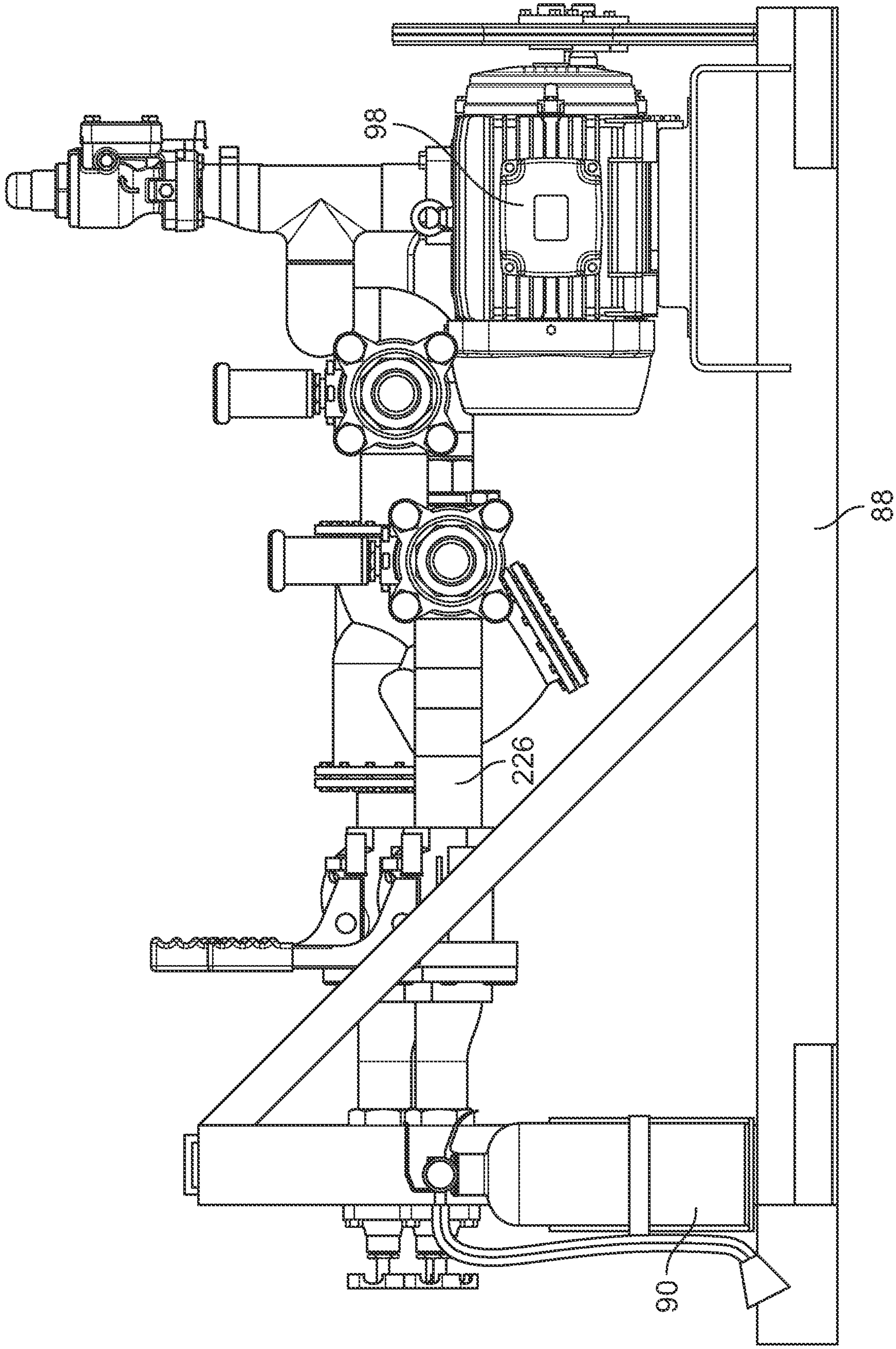
FIG. 6C is a side view of one embodiment of the system of the present disclosure.
Figure 7A:
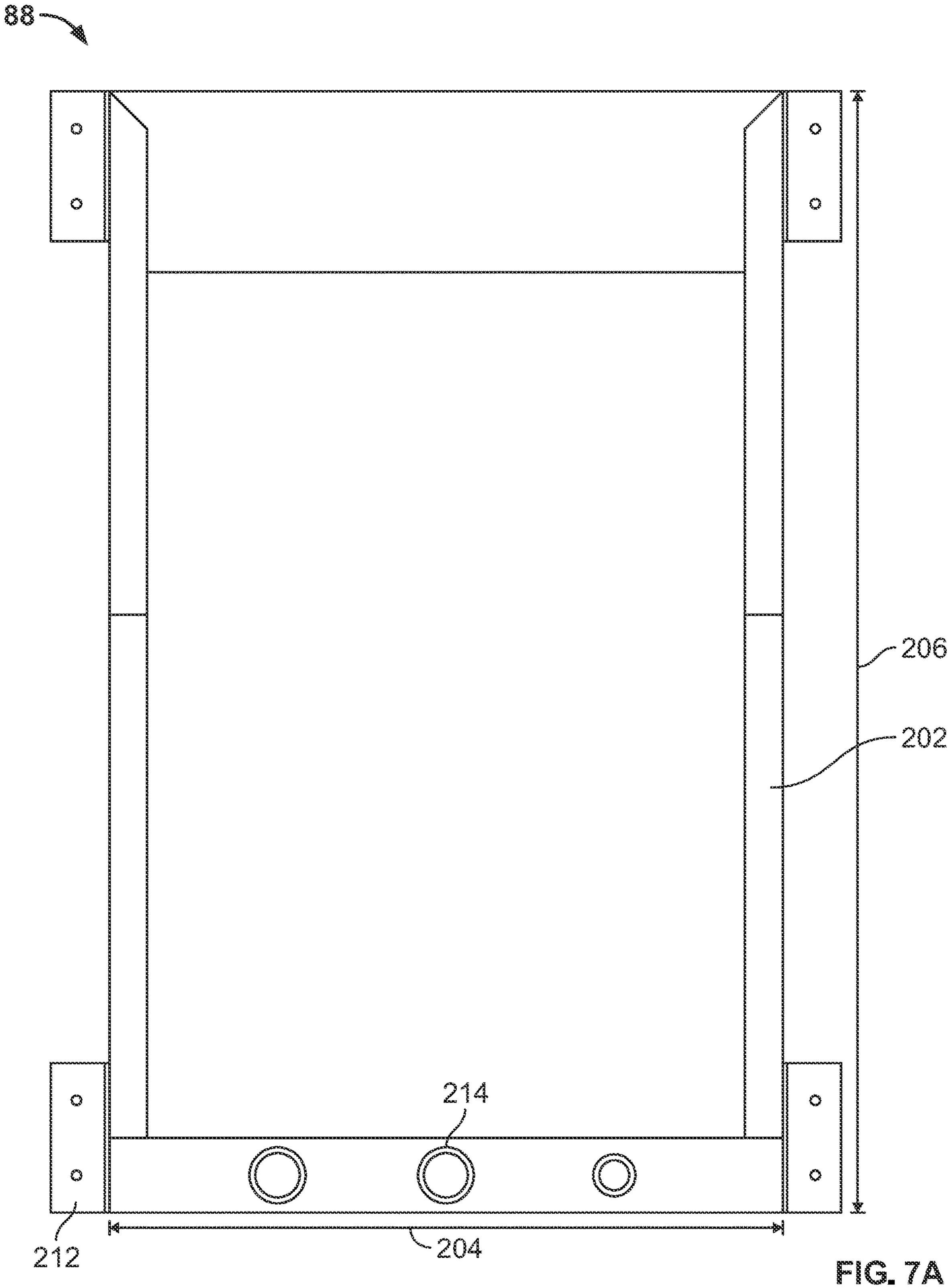
FIG. 7A is atop down view of the frame of the system of the present disclosure.
Figure 7B:
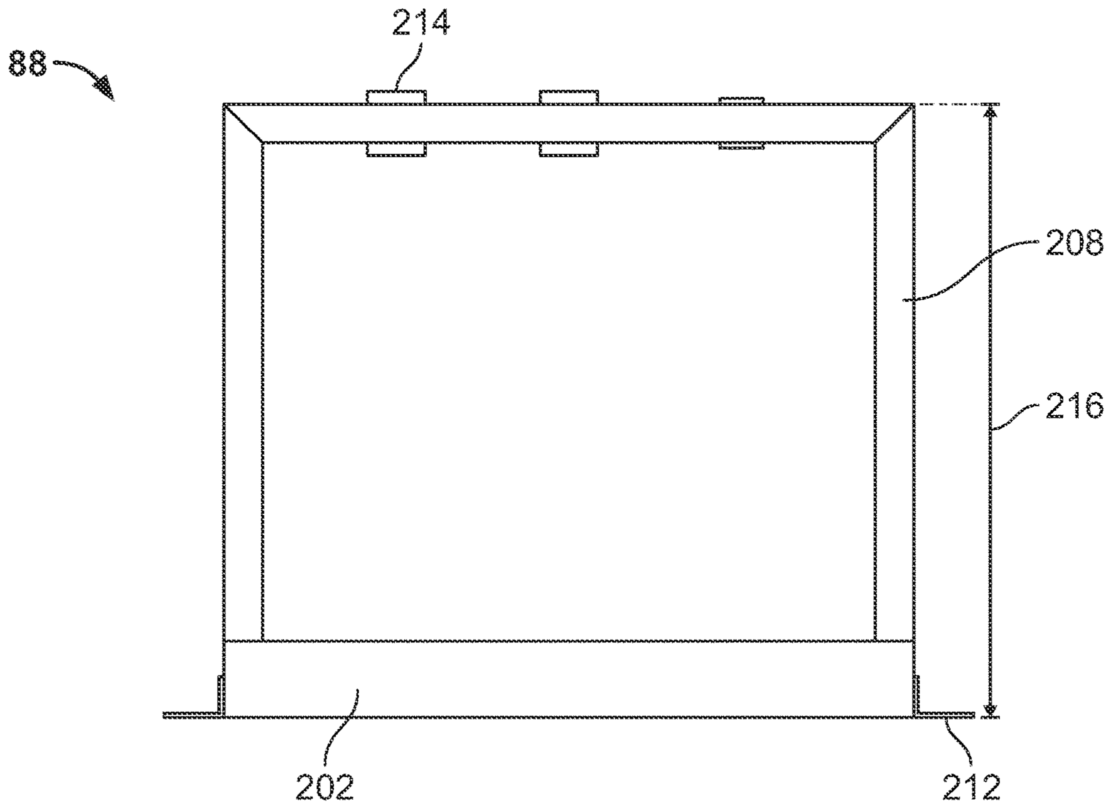
FIG. 7B is a front view of the frame of the system of the present disclosure.
Figure 7C:
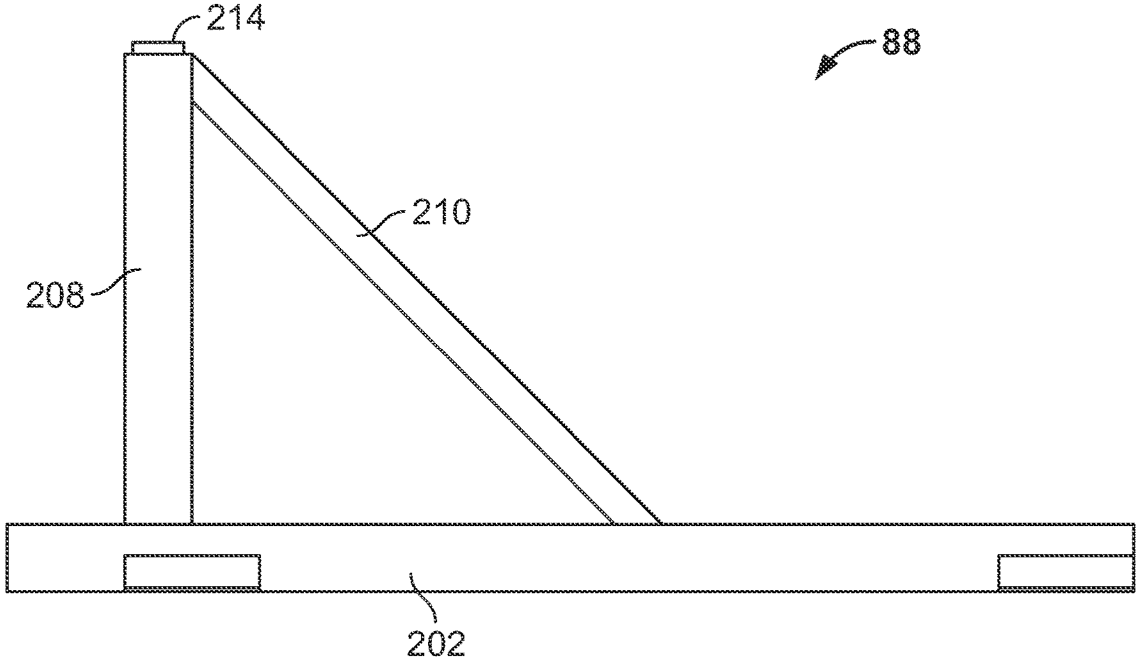
FIG. 7C is a side view of the frame of the system of the present disclosure.
Figure 7D:
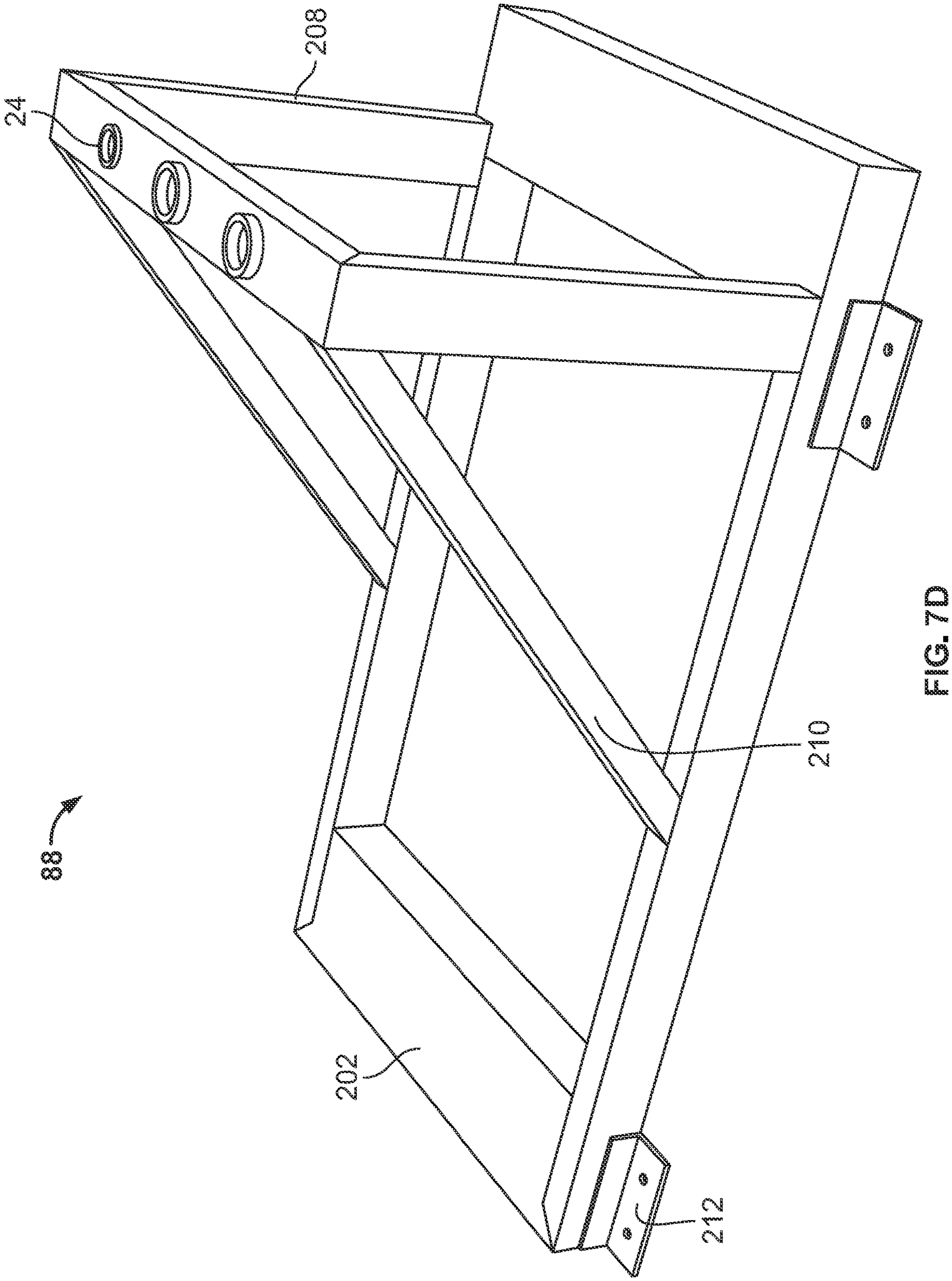
FIG. 7D is a perspective view of the frame of the system of the present disclosure.

Now referring to FIGS. 6A-6C, various views of one embodiment the system 10 are provided. The system 10 is housed on frame 88. Motor 98 powers pump 32. Motor 98 may include a soft start feature 228, which may be a component within motor 98 or may be a separate component connected to motor 98. Soft starter feature 228 may act on starter voltage and/or starter current and reduce power voltage. Pump 32 has a pump inlet and pump outlet 220. Pump outlet 220 is connected to pump outlet pipe 222. Pump outlet pipe 222 is connected to pipe section 30 of apparatus 8. The general location of apparatus 8 in an exemplary system is shown. Pipe section 30 includes elbow 40, which is connected to pump side 22 of apparatus 8. Vane 16 is located approximately within the area indicated surrounded by vane housing 78. Valve 26 is disposed hose side 24 of apparatus 8. A reducer 232 that reduces pipe diameter is preferably disposed directly downstream from valve 26. The reduced pipe diameter of reducer 232 is not visible in this view but understood to be present within the piping. Fluid then flows into the tank to be filled through hose connector 28 and its flow rate is controlled by valve 34. Although system 10 is shown with only one vane 16 and one hose connector 28, some embodiments system 10 include two or more (e.g., three, four, five) vanes 16 and hose connectors 28, to accommodate filling two or more tanks (e.g., two, three, four) at once with a single pump 32. Filling may occur sequentially and/or simultaneously.

Fluid enters system 10 in the direction of arrow A through passing through tank connector 96 and the flow of the fluid is controlled by tank ball valve 92. System 10 may include a section of increased diameter 224 to slow the flow of the fluid. System 10 may also include a transport unload pipe 226. Displaced vapor from the tank being filled, vapor distinct from the cavitation bubbles, may be released in the direction of arrow C from the tank through transport unload connector and its flow may be controlled by transport unload valve 229. A fire extinguisher 90 may be included.

Now referring to FIGS. 7A-7D, various views of the frame 88 of the system 10 are provided. Frame 88 has rectangular base 202 with base width 204 and base length 206. As shown base width 204 may be 3' and base width 206 may be 5'. It is preferred, however, that each of base width 204 and base length 206 be no greater than 5'. Frame 88 includes upright piece 208 with height 216. Upright piece height 216 in preferred frame may be from 1' to 10' or from 1' to 5' or from 2' to 4' (e.g., 2' 8"). Upright piece 208 is supported by support beams 210. Upright piece 208 may include one or more pipe connections 214, where various pipes of the system 10 may extend and be supported. While frame 88 is likely to stay in place by weight and gravity on its own, frame 88 may include anchors 212 to secure it to the ground.

Figure 8A:
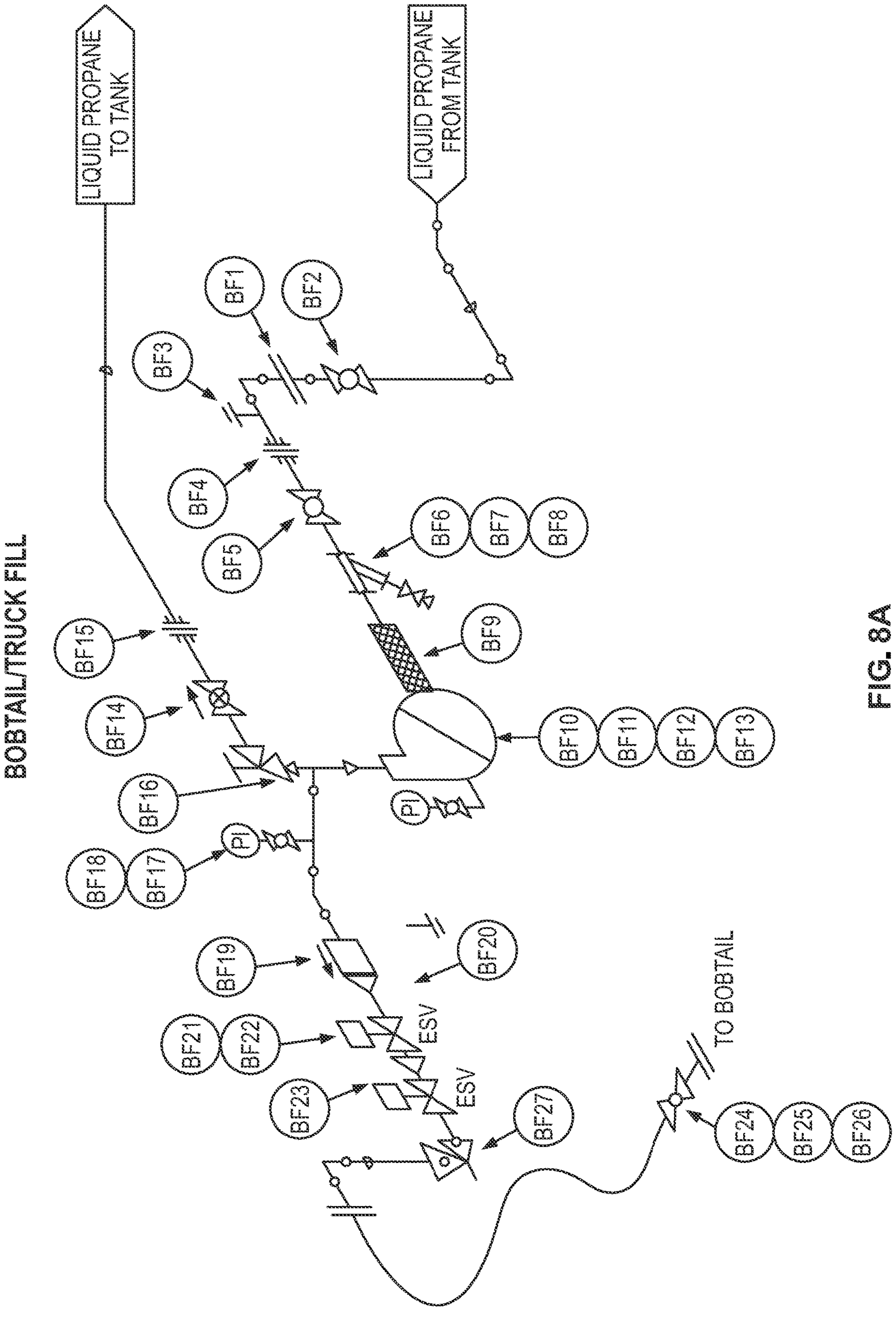
FIGS. 8A-8B are detailed schematics of the components of the system of the present disclosure with the main line representing the hose or pipe through which the fluid flows.
Figure 8B:
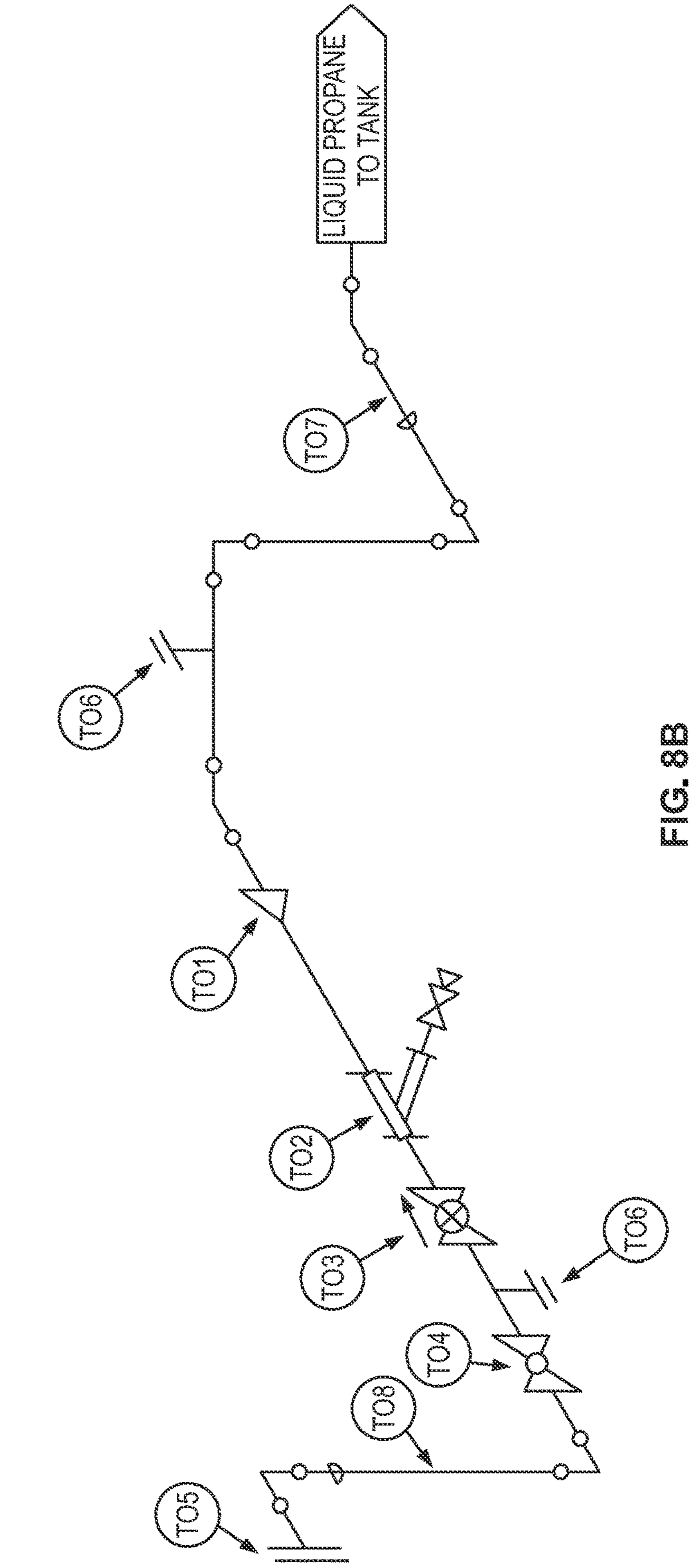

Now referring to FIGS. 8A-8B, detailed schematics of the components of system 10 are provided, with the lines generally representing the path of the fluid. Not all components illustrated in these figures are necessary and other configurations could achieve similar results. These variations are considered to be within the scope of the present disclosure.

Referring to FIGS. 6A and 8A, the arrow box labeled "LIQUID PROPANE FROM TANK" generally corresponds to arrow A in FIG. 6A. Following that line to the left, the fluid passes through tank ball valve 92. A main hydrostatic relief valve BF3 may be included and may have flanges BF1 on either side of it. Next is an isolation shutoff valve-BF5 and a pump line strainer BF6, BF7, or BF8. Pump line strainer, or a component of BF6, BF7, or BF8 as a bleeder and may be cleaned periodically to protect the end line of pump 32 or BF10, BF11, BF12, or BF13 from sediment and other buildup. Flexible BF10 may include pressure gauge BF17, or BF18, Pump outlet 220 is on the other side of pump 32. The T indicated directly above pump outlet 220 may not be a 900 angle as shown, but a gentler separation. Bypass valve BF16 separates the line going into transport unload pipe 226 and the line going toward vane 16, which may be a vane BF19 of the present disclosure that reduces or eliminates cavitation. The dashed line B through bypass valve 268 or BF16 identifies the section where above and to the right of the line B is provided in more detail in FIG. 8B. On the other side of the line B includes another pressure gauge BF16, or BF17, vane 16 (e.g., apparatus 8, an apparatus from FIGS. 1-4), valve 26, BF21, or BF22, reducer 232, emergency shutoff valve 234 or BF23, right angle full port globe valve 250 or BF27, hose BF24, BF25, or BF26, and hose globe valve BF24, BF25, or BF26. The end indicating "TO BOBTAIL" generally corresponds to arrow B in FIG. 6A.

Figure 9:
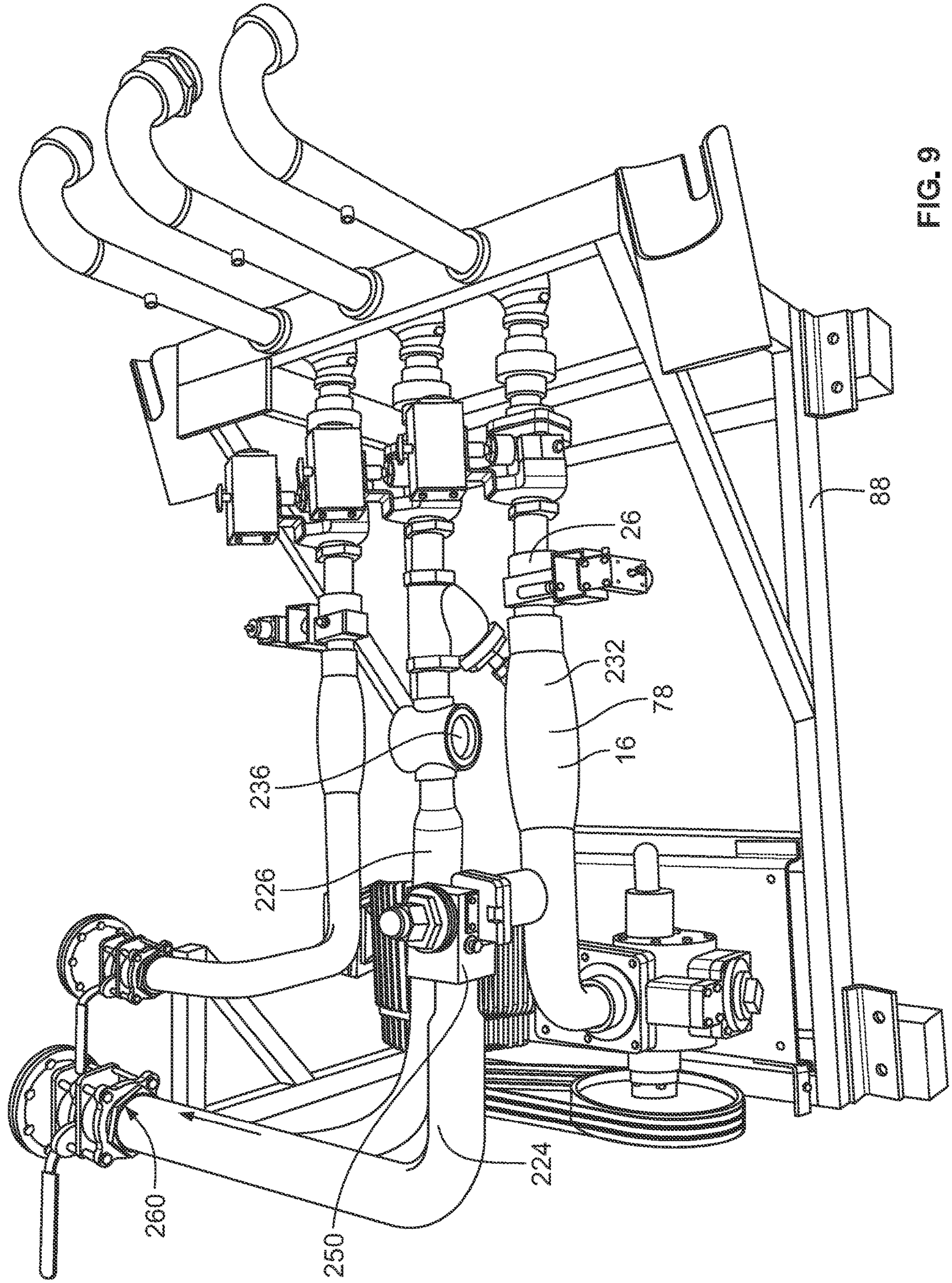
FIG. 9 is an isometric view of an embodiment of the system of the present disclosure.

Now referring to FIGS. 8B and 9, details on the section of system 10 specific to transport unload pipe 226 are provided. Starting from the left, which roughly corresponds to dashed line B in FIG. 8A, transport unload pipe 226 includes transport unload globe valve TO4, a transport unload hydrostatic relief TO6, sight check 236, TO3, transport unload strainer TO242, transport unload concentric reducer TO1, and another a transport unload hydrostatic relief TO6. This system may be used in a variety of systems for fluid movement between vessels, such as from the transport of a transport truck (e.g., 9,000 gallon transport truck) to a holding tank (e.g., a 3,000 gallon holding tank) and/or from a holding tank (e.g., 3000 gallon holding tank) to a delivery truck/bobtail (e.g., 3000 gallon delivery truck, 3000 gallon bobtail).

Now referring to FIG. 9, an isometric view of the preferred embodiment the system is shown. Vane 16 is housed within vane housing 78. Although blocked from sight in this view by the sign, the system may include a valve (e.g., valve 26 from any of FIGS. 1-4) and a reducer (e.g., reducer 232 (e.g., valve 26 from any of FIGS. 1-4) are downstream of vane 16. Transport unload pipe 226 is in the middle of the image. Sight check 236 provides a user to gain an actual view of the flow out of transport unload pipe 226. Section of increased diameter 224 is part of the "T" pipe 226 which is connected to bypass valve 250 prior to entering vane 16. The other end of the "T" pipe is connected to isolation valve 260. Frame 88 may support all other system components.

EXAMPLES

Example 1

Table 1 provides five measurements were performed on a system having a 6" long vane of the present disclosure having helical flutes having a 23.5°±2° with respect to the major longitudinal axis. The vane had 3 flutes on the inner pipe, each flute having a height of 1" and a width of 3". The vane housing had an inner diameter of 4" and an outer diameter of 4.5". The inner pipe was a Schedule 40 pipe having an inner diameter of 1" and an outer diameter of 1.25" with the flutes attached thereto as described herein. In each test, the vanes were positioned in a system which transferred a total of 2974.15 gallons of unpressurized water and compared to an otherwise identical system not having the vane (control).

TABLE 1

| Test (control) | Proto Type Test 1 | Proto Type Test 2 | Proto Type Test 3 | Proto Type Test 4 | Proto Type test 5 |
|---|---|---|---|---|---|
| 15 BHP Motor 208 3 Phase, 3" Corken Pump, DC control ABB VFD, 2" outlet, 3" inlet/16.8 min. | 9.4 min | 11.6 min | 10.4 min | 9.2 min | 11.2 min |
| Gallons Pumped/177 Gallons per minute for total of 2974.15 gallons | 316 gallons per minute for total of 2974.15 gallons | 256.39 gallons per minute for a total of 2974.15 gallons | 285.97 gallons per minute for a total of 2974.15 | 323.27 gallons per minute for a total of 2974.15 | 265.54 gallons per minute for a total of 2974.15 |
| VFD Settings/50 Hz | 60 hertz DC | 50 hertz DC | 55 hertz DC | 72 hertz DC | 58 hertz DC |
| Distance from inlet to tank/10' | 10' | 10' | 10' | 10' | 10' |
| Distance from outlet to tank/12' | 12' | 12' | 12' | 12' | 12' |

As can be seen, the presence of the vane was able to increase pumping efficiency as compared to the control test in both increases in gallons pumped and decreases in pumping time.

As various changes can be made in the above-described subject matter without departing from the scope and spirit of the present disclosure, it is intended that all subject matter contained in the above description, or defined in the appended claims, be interpreted as descriptive and illustrative of the present disclosure. Many modifications and variations of the present disclosure are possible in light of the above teachings. Accordingly, the present description is intended to embrace all such alternatives, modifications and variances which fall within the scope of the appended claims.

All documents cited or referenced herein and all documents cited or referenced in the herein cited documents, together with any manufacturer's instructions, descriptions, product specifications, and product sheets for any products mentioned herein or in any document incorporated by reference herein, are hereby incorporated by reference, and may be employed in the practice of the disclosure.

The invention claimed is:

1. An apparatus for efficient transfer of a fluid, said apparatus comprising:
- a vane housing and an inner pipe disposed within said vane housing;
- an inner space formed within said inner pipe;
- an outer space formed between said vane housing and said inner pipe;
- a vane disposed within said outer space comprising a plurality of flutes and extending between a vane front and a vane back;
- a pump side disposed adjacent to said vane front and attached to said vane housing;
- a hose side disposed adjacent to said vane back and also attached to said vane housing;
- a pipe section connected to said pump side and said pipe section comprises an elbow;
- a directional plate disposed within said pipe section at said elbow, wherein said directional plate has a pump end attached to a wall of the elbow, a hose end attached to said elbow wall, and a directional plate angle disposed between the hose end attachment and pump end attachment such that said directional plate angle is unattached to said elbow wall.

2. The apparatus of claim 1, further comprising a valve disposed within said hose side, wherein said valve is movable from a closed position such that the fluid cannot pass said valve and an open position such that the fluid can pass said valve.

3. The apparatus of claim 1, further comprising a pump disposed downstream from said pump side.

4. The apparatus of claim 1, further comprising a hose connector disposed at said hose side.

5. The apparatus of claim 1, wherein at least one of said plurality of flutes comprises a flute curvature.

6. The apparatus of claim 1, wherein at least one of said of said plurality of flutes is straight.

7. The apparatus of claim 1, wherein said vane further comprises a vane cap, where at least two of said plurality of flutes cross across said inner space at said vane front.

8. The apparatus of claim 1, wherein said inner space comprises a structural support.

9. The apparatus of claim 1, wherein said plurality of flutes are attached to and extend outward from said inner pipe.

10. A system for efficient transfer of a fluid, said system comprising:
- an apparatus, comprising:
  - a vane housing and an inner pipe disposed within said vane housing;
  - an inner space formed within said inner pipe;
  - an outer space formed between said vane housing and said inner pipe; and
  - at least one vane disposed within said outer space, wherein said at least one vane comprises a plurality of flutes extending between a vane front and a vane back;
- a pump side disposed adjacent to said vane front and attached to said vane housing; and
- a hose side disposed adjacent to said vane back and also attached to said vane housing;
- a pump, comprising a pump inlet and a pump outlet;
- a motor that powers said pump;
- a pump outlet pipe extending between said pump outlet and said pump side of said apparatus, wherein said pump outlet pipe comprises an elbow;
- at least one hose connector disposed at said hose side of said apparatus, and
- a directional plate disposed within said pump outlet pipe at said elbow, wherein said directional plate has a pump end attached to a wall of the elbow, a hose end attached to said elbow wall, and a directional plate angle disposed between the hose end attachment and pump end attachment such that said directional plate angle is unattached to said elbow wall.

11. The system of claim 10, further comprising a frame that supports said apparatus, said pump, said pump outlet pipe, said hose connector, and said motor.

12. The system of claim 11, wherein said frame comprises a base length of no more than 5' and a base width of no more than 5'.

13. The system of claim 10, wherein said motor comprises a soft start feature.

14. The system of claim 10, further comprising a transport unload pipe, a transport unload valve, and a transport unload connector.

15. The system of claim 14, wherein said pump outlet pipe comprises a section of increased diameter.

16. The system of claim 10, wherein said apparatus comprises two or more said vanes and comprises a single pump and said system comprises two hose connectors.

* * * * *